United States Patent [19]

Ando

[11] 3,896,493

[45] July 22, 1975

[54] RETRACTABLE HEAD FOR TAPE RECORDER

[76] Inventor: Masatoshi Ando, No. 6-3 Higashigaoka, 2-chome, Tokyo, Japan

[22] Filed: Oct. 30, 1973

[21] Appl. No.: 411,111

[30] Foreign Application Priority Data

Nov. 8, 1972 Japan .............................. 47-128768

[52] U.S. Cl. .................................... 360/96; 360/105

[51] Int. Cl.$^2$ ............................................ G11B 5/54

[58] Field of Search ......... 360/93, 96, 104, 105, 92; 274/4 C, 4 D, 4 F; 242/199

[56] References Cited

UNITED STATES PATENTS

| | | | |
|---|---|---|---|
| 3,126,535 | 3/1964 | Streeter | 340/174.1 C |
| 3,474,432 | 10/1969 | Sevilla | 340/174.1 B |
| 3,585,291 | 5/1971 | Yamakawa | 178/6.6 P |
| 3,663,763 | 5/1972 | Trost | 178/6.6 P |
| 3,663,764 | 5/1972 | Trost | 178/6.6 P |

*Primary Examiner*—Daryl W. Cook
*Assistant Examiner*—Jay P. Lucas
*Attorney, Agent, or Firm*—Jay M. Cantor

[57] ABSTRACT

A tape cassette phonograph is so constructed that during its recording or reproducing operation, the tape head and pinch roller can be retracted from the tape, while the take-up reel continues to feed the tape forwardly at an increasing rate of travel. The tape head and pinch roller may be returned to operative engagement with the tape after a desired amount of tape has been fed forwardly.

8 Claims, 11 Drawing Figures

RETRACTABLE HEAD FOR TAPE RECORDER

DESCRIPTION OF THE INVENTION

This invention relates to an improved tape recorder mechanism used mainly in automobiles and the like.

The mechanism features a fast forwarding device which permits fast forwarding of the tape (contained in a conventional tape cassette), with the cassette loaded in the mechanism by pushing an auxiliary push-button, said operation of the pushbutton removing the tape-head, pinch-roller and capstan from the tape and permitting rapid wind-up (fast forwarding) of the tape.

It is evident that by reloading the cassette after turning it over to the other side ('A' side to 'B' side and vice versa), rewinding of the initially loaded side is accomplished.

In conventional tape recorders for mounting in automobiles, a fast forwarding device of this nature is usually not provided, thus to play a selection of desired music contained in the after part of the cassette, one had to wait until the selected part arrived at the normal playing speed. Moreover, to replay a just played selection required a long waiting period. As a result of a series of experiments, the inventor devised this simple yet effective fast forwarding mechanism to overcome the above described shortcomings.

The attached drawings describe the mechanical part only, precluding the electrical components and wiring.

FIG. 4 is a partial plan view; with the hinged plate removed and showing the auxiliary push button pushed in;

FIG. 11 is a side view with the main push button pushed in.

Figure 1:
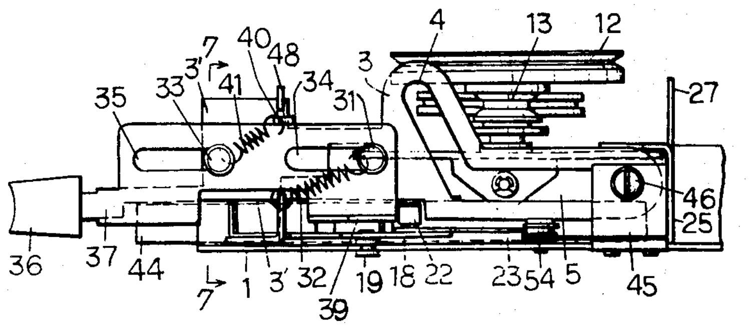
FIG. 1 is a side view.

An embodiment of this invention is described hereunder with reference to FIGS. 1–8.

Main push button slide bar 3 has main push button 2 attached thereon, and slidably mounted on chassis plate 1. Main slide bar 3 has a slot 4 sloping downwards and then horizontal 5 to its rear part. Guide pin 31 fixed to above main slide bar 3 has coil spring 32 attached thereto, the other end of spring 32 being attached to chassis plate 1, to spring load the main slide bar to its outward position. Guide screw 46 is attached to bracket 45 of chassis plate 1 by square nut 47 to slidably retain main slide bar 3. Also protrusion 3′, at the top, and the bottom edge of main slide bar 3 is slidably held by upper and lower slits 49 and 50 formed in guide bracket 48 fixed to chassis plate 1 to hold main slide bar vertically yet permitting sliding movement along its longitudinal axis without twisting or slanting from the vertical.

Chassis plate 1 has on its side 51, (refer to FIG. 6), retaining plate 52 securing end 53 of a hinged plate 6 permitting said hinged plate 6 to move up and down with end 53 as its hinge axis.

Free end 7 of hinged plate 6 has roller 8 attached, positioned to engage slot 4 and 5 of main slide bar 3. Hinged plate 6 also has capstan flywheel 12 with small pulley 13 fixed to capstan shaft 11 and rotatably mounted thereon, and take-up hub spindle attached through a friction clutch to pulley 15 and also rotatably mounted to said hinged plate 6. Belt 10 drives aforesaid capstan flywheel by motor 9 mounted on the chassis plate, and belt 14 drives pulley 15 which in turn drives take-up hub spindle to take-up the tape in the cassette.

Head plate 18 to which heat 17 is attached, has guide studs 19, (refer to FIG. 5), which engage with slit 20 and sides 21 of a rectangular opening in the chassis plate to slidably guide heat plate 18 as well as position it at its extreme pushed-in position.

Stud 22 is riveted to head plate 18 and engages the end of spring 23 wound around spring stud 54 fixed to chassis plate 1 and with its other end fixed to the chassis plate to spring load head plate 18 to return to its tape engaging position.

Actuating arm 25 pivotally mounted on stud 24 fixed to chassis plate 1, has topward protruding section 27 with small step 55. Protrusion 56 of hinged plate 6 engages aforesaid step 55 and keeps hinged plate supported in its lifted position.

Pinch roller arm 28 is rotatably mounted on stud 24 with the aforesaid pivotally mounted actuating arm 25, coil spring 30 is bridged across bottom member 26 of the actuating arm 25 and pinch roller arm 28 to spring load the idler 29 against the capstan.

Main push button slide bar 3 has guide pins 31 and 33. Slide plate 37 with auxiliary push-button 36 mounted parallel to the main push button slide bar 3, has longitudinally slotted guide holes 34 and 35. Slide plate (37) is slidably mounted by said guide holes 34 and 35 in conjunction with guide pins 31 and 33 to move parallel to main slide bar 3. Coil spring 32 bridged across between guide pin 31 and guide bracket 48, spring loads slide bar 3 to be constantly pulled outwardly but stopped by the end of horizontal slot 5 engaging guide screw 46. Cam plate 39 with inwardly sloping cam surface 38 is formed at the bottom of slide plate 37 parallel to the surface of chassis plate 1. Coil spring 41 is bridged across between protrusion 40 of the slide plate 37 and guide pin 33 of slide bar 3, constantly pulling slide plate 37 outwardly, stopped by back ends of guide slots 34 and 35 engaging guide pins 31 and 33.

Protrusion 42 at the end of pinch roller arm 28 is engaged by finger 43 formed in head plate 18 thus when the head plate is withdrawn pinch roller arm 28 is pulled back to rotate against force of spring 30, and pinch roller is retracted from capstan 11.

When cassette 44 is loaded in the mechanism, that is in 'play' position or when finished playing, main push button 2 is depressed against force of spring 32. Slide bar 3 is moved inwardly (towards the rear of the mechanism) roller 8 of the hinged plate 6 follows slot 5 then sloped slot 4, to push plate 6 upwards. Roller 8 rises until it hits the end of slot 4. Capstan 11 and tape take-up spindle drive assembly 15 are retracted from the capstan opening and tape-hub drive opening of cassette 44. Slide plate 37 with elongated slot holes 34, 35 engaging guide pins 31, 33 of aforesaid slide bar 3 moves with slide bar 3. Tapered edge 38 of cam 39 formed on the bottom of slide plate 37 engages roller 22 of head plate 18 to move the head plate against the load of spring 23, and thus lift head 17 outwardly away from the head opening of cassette 44.

Figures 2, 8:
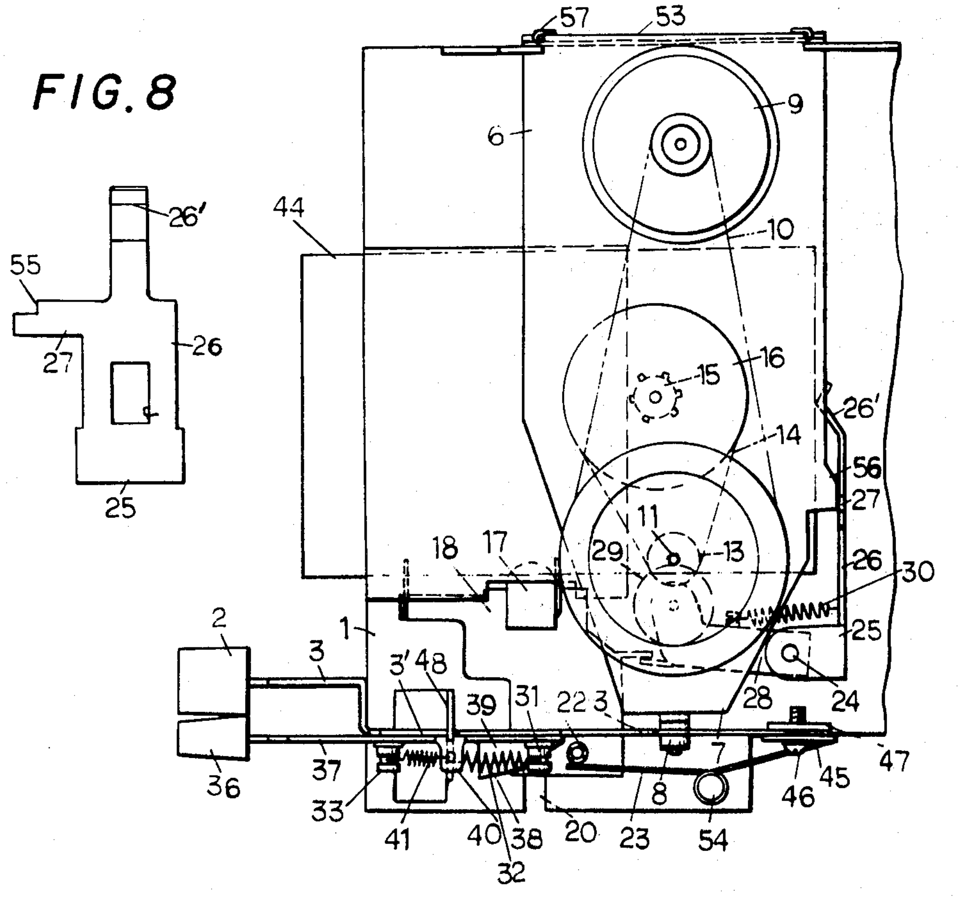
FIG. 2 is a plan view.
FIG. 8 is a back view of the actuating arm.
Figure 3:
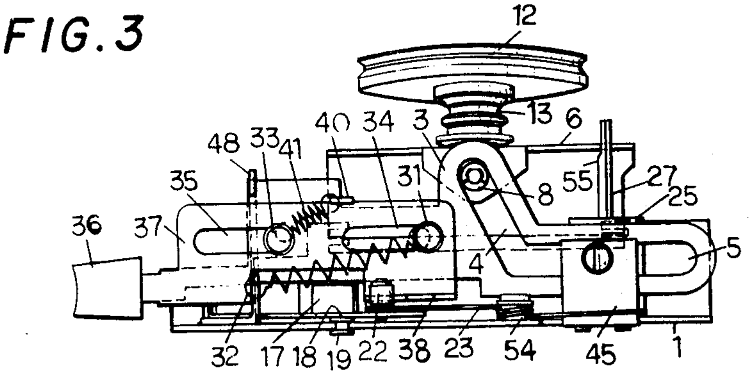
FIG. 3 is a side view of the main push button in depressed (push-in) position.
Figure 4:
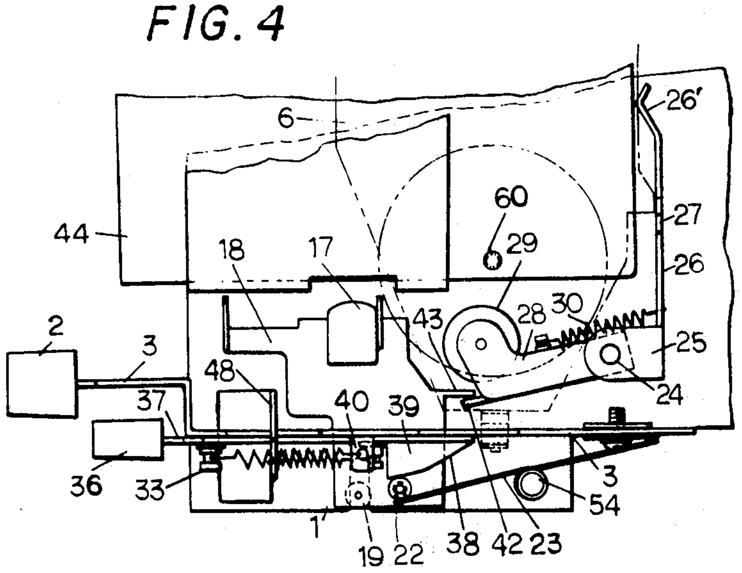
Figure 5:
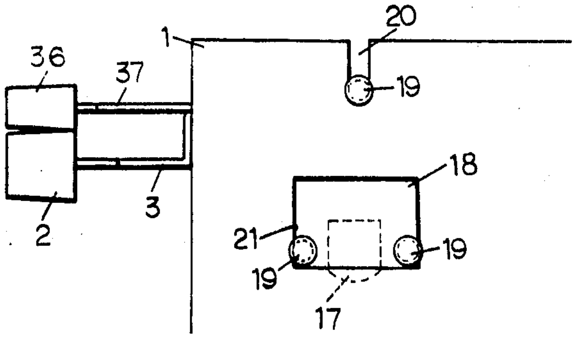
FIG. 5 is a partial bottom view.
Figure 7:
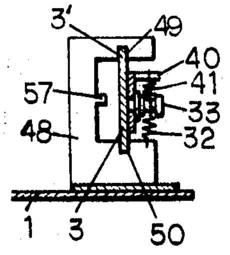
FIG. 7 is a section along 7—7 of FIG. 1.
Figure 6:
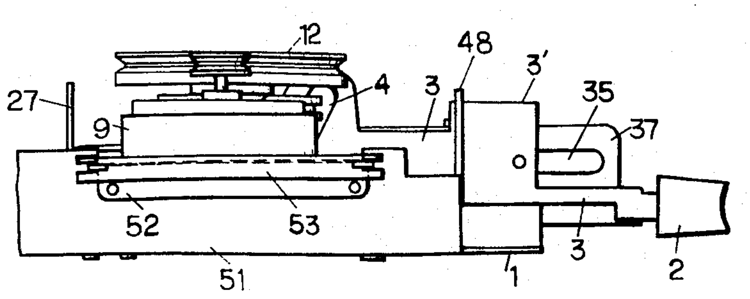
FIG. 6 is a side view of the side opposite to FIG. 1.

Outward movement of head plate 18 causes anti-clockwise rotation of pinch roller arm 28 against the spring loading as shown in FIG. 2, through engagement of finger 42 with protrusion 43 at end of arm 28, and thus pinch roller 29 is retracted from the pinch roller aperture in cassette 44. Lifting of guide plate 6 combined with tension of spring 30 created by rotation of pinch roller arm 28 causes tip 26' of arm 26 of actuating member 25 to rotate anti-clockwisely to push cassette 44 out of the mechanism. When arm 26 of actuating member 25 rotates, step 55 formed in top protrusion 27 engages bottom edge of hinged plate 6 to hold said plate 6 in lifted position. At this time, head 14 and pinch roller 29 remains retracted, main push-button 2 and auxiliary push-button 36 both remain locked in their depressed position.

When cassette 44 is inserted through the guide slot (not shown in the drawings) between hinged plate 6 and chassis plate 1, tip 26' of actuating arm 26 is pushed by the cassette and actuating member 25 with arm 26 is rotated clockwise as shown in FIG. 2. Step 55 disengages from hinged plate 6 permitting hinged plate to drop, main slide bar 3, slide plate 37 and its cam plate 39 all retract to the position where push buttons fully emerge, through action of spring 32. Simultaneously hinged plate 6 is pulled down through action of roller 8 along sloping slot 4, and capstan 11 tape take-up spindle drive wheel 15 engage their respective openings in cassette 44. Tapered surface 38 of cam plate 39 causes aforedescribed action; through its shape in conjunction with the spring loads of springs 23 and 30, to move head plate 18 and pinch roller arm 28 slightly-after movement of the hinged plate, to engage the cassette and start playing the tape. Although this is not shown in the drawings, when arm 26 of actuating member 25 is pushed by the cassette to release the guide plate to its original position, a switch is turned-on to connect the power source for the electrical part of the equipment.

Rotation of motor 9 is transmitted to capstan flywheel assembly 11 and to the tape take-up spindle assembly 15 by means of rubber belts, the tape being transported past the head at the designated tape speed to reproduce the tape.

When auxiliary push button 36 is pushed-in while the mechanism is in 'play' condition as described above, slide plate 37 moves rearwards, and slanting surface 38 of cam plate 39, (attached to bottom of aforesaid slide plate 37), engages head plate 18 to move it away from the cassette to retract head 17 from the head opening of cassette 44. Simultaneously, finger 43 of head plate 18 engages protrusion 42 of pinch roller arm 28 to rotate it in an anticlockwise direction against the tension of spring 30, to disengage the pinch roller 29 from capstan 11. When pinch roller 29 is retracted from capstan 11, the tape is transported at a fast speed through winding action of tape take-up hub assembly 15.

When auxiliary push button 36 is released, slide plate 37 and its cam plate 39 is pulled back by tension of spring 41. Head plate 18 is pushed forward, and pinch roller arm 28 is rotated by the action of springs 23 and 30 to return head 17 and pinch roller 29, to engage the tape, and transport it again at its designated playback speed.

When main push button 2 is depressed cassette 44 will be ejected and the cassette may be turned over to its other side and re-inserted, after which the auxiliary button is depressed to fast forward the tape, and released at an appropriate point in the tape. The main push button 2 can be depressed again to eject the tape, which can be re-inserted after turning over to replay the first mentioned tape portion.

Figure 9:
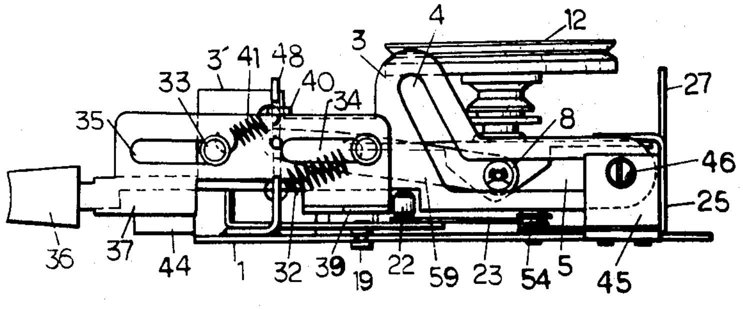
FIG. 9 is a side view of a modified type of mechanism.
Figure 10:
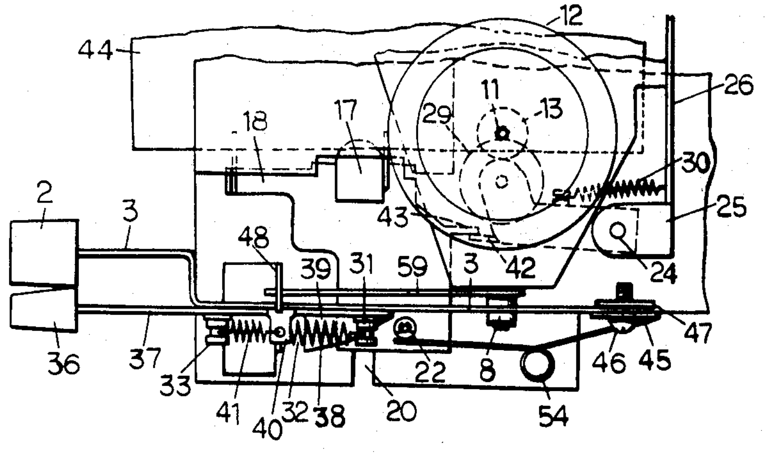
FIG. 10 is a partial plan view of FIG. 9.
Figure 11:
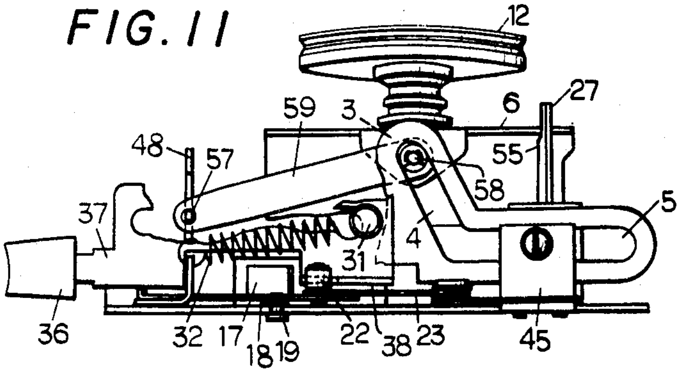

In the modified tape recorder shown in FIGS. 9, 10 and 11 connecting plate 59 pivotally connects axle 58 of roller 8 fixed to the free end 7 of hinged plate 6, with protrusion 57 formed in guide bracket 48. Construction and operation of this modified tape recorder is exactly the same with the initially described tape mechanism with the exception of connecting plate 59 and its function. The notations designate the same parts through FIG. 1 to FIG. 8.

When the mechanism is in play position, connecting plate 59 pivotally attached at one end to protrusion 57 of guide bracket 48 — mounted on chassis plate 1, pivotally holds axle 58 of roller 8 — attached to free end 7 of hinged plate 6, at which time roller 8 is engaged by horizontal slot 5 of slide bar 3, and thereby holds hinged plate 6 firmly clamped in position to prevent vibrations in the left-to-right direction as shown in FIG. 10. This in turn prevents uneven transport of the tape by capstan 11, and ensures faithful reproduction.

What is claimed is:

1. In a tape cassette phonograph wherein the cassette is provided with a take-up reel,
   said phonograph having a tape transducer head, a capstan and a pinch roller,
   driving means operative to drive the take-up reel and capstan,
   means mounting the head for movement into and out of operative engagement with the tape,
   means mounting the pinch roller for movements toward and from the tape to alternately press it into engagement with the capstan and to relieve such pressure,
   means normally biasing the head and pinch roller into engagement with the tape,
   control means for rendering the driving means inoperative to drive the take-up reel and capstan and for simultaneously retracting the head and pinch roller from the tape,
   means forming part of said control means and independently operable relative thereto to solely retract the head and pinch roller from the tape without rendering the drive means inoperative to drive the take-up reel.

2. In a tape cassette phonograph in accordance with claim 1 wherein the head is mounted on a movable support and means operated by the movable support upon movement thereof in retracting the head from the tape to retract the roller from the tape to relieve the pressure against the capstan.

3. In a tape cassette phonograph in accordance with claim 2 wherein said movable support is mounted for linear sliding movement.

4. In a tape cassette phonograph according to claim 1 including a plate movably mounted for movement toward and from the cassette.
   said driving means operative to drive the take-up reel comprising a driven spindle mounted on said plate for driving engagement with the take-up reel when the plate is moved toward said cassette, and means for selectively moving the plate toward and away from said cassette.

5. In a tape cassette phonograph according to claim 4 wherein the capstan is supported on said plate, and means operated by said plate upon movement thereof away from the cassette for retracting said head, capstan and roller from the tape.

6. In a tape cassette phonograph according to claim 4 wherein said head is mounted on a support which is movable independently of the plate, and means operated by manual movement of the support to retract the head from the tape, said roller being simultaneously retracted from the tape while the driven spindle is in driving engagement with the take-up reel, by means on the support cooperating with said roller.

7. In a tape cassette phonograph according to claim 6 including means operated by the plate in its movement away from the cassette for moving the support to retract said head and roller from the tape.

8. In a tape cassette phonograph according to claim 1 wherein the driving means comprises a motor mounted on the phonograph chassis, a plate hinged to the chassis for movements toward and away therefrom by said control means, spindle means rotatably mounted on said plate for drivingly engaging the take-up reel of the cassette mounted on the chassis when the plate is moved toward said chassis, a flywheel fixed to said capstan, said capstan and flywheel being rotatably mounted on said plate, and means drivingly connecting the motor on the chassis to said flywheel and said spindle means, said transducer head and pinch roller being independently mounted on the chassis for movements toward and from the tape.

* * * * *